United States Patent
Rudolfi

(10) Patent No.: US 8,807,645 B2
(45) Date of Patent: Aug. 19, 2014

(54) DEVICE FOR SEALING THE APERTURE OF A TIPPED-BACK SLIDING ROOF

(75) Inventor: Kari Rudolfi, Krefeld (DE)

(73) Assignee: Gemo G. Moritz GmbH & Co. KG, Krefeld (DE)

( * ) Notice: Subject to any disclaimer, the term of this patent is extended or adjusted under 35 U.S.C. 154(b) by 0 days.

(21) Appl. No.: 13/988,717

(22) PCT Filed: Nov. 10, 2011

(86) PCT No.: PCT/EP2011/005637
§ 371 (c)(1),
(2), (4) Date: May 21, 2013

(87) PCT Pub. No.: WO2012/069140
PCT Pub. Date: May 31, 2012

(65) Prior Publication Data
US 2013/0241243 A1    Sep. 19, 2013

(30) Foreign Application Priority Data
Nov. 23, 2010    (DE) .......................... 10 2010 052 027

(51) Int. Cl.
*B60J 7/057*    (2006.01)
(52) U.S. Cl.
CPC ..................................... *B60J 7/0573* (2013.01)
USPC ........................................ 296/223; 296/216.02
(58) Field of Classification Search
CPC ............................................ B60J 7/00–7/0576
USPC .............................. 296/216.01–224, 213–214
See application file for complete search history.

(56) References Cited

U.S. PATENT DOCUMENTS
5,652,565 A * 7/1997 Salcedas et al. .............. 340/479

FOREIGN PATENT DOCUMENTS
| | | |
|---|---|---|
| DE | 2636749 A1 | 2/1978 |
| DE | 10125638 C1 | 11/2002 |
| DE | 202007009582 U1 | 10/2007 |
| EP | 2159089 A1 | 3/2010 |
| WO | 2005/120874 A1 | 12/2005 |

OTHER PUBLICATIONS
International Preliminary Report on Patentability dated May 28, 2013 in corresponding International Application No. PCT/EP2011/005637, filed Nov. 10, 2011.

* cited by examiner

*Primary Examiner* — Dennis H Pedder
(74) *Attorney, Agent, or Firm* — Rankin, Hill & Clark LLP

(57) ABSTRACT

The invention relates to a device for sealing the aperture of a tipped-back sliding roof of a car. The device has a control device designed to monitor the gearbox of the car and ensure that the aperture is sealed when the reverse gear is engaged.

4 Claims, 1 Drawing Sheet

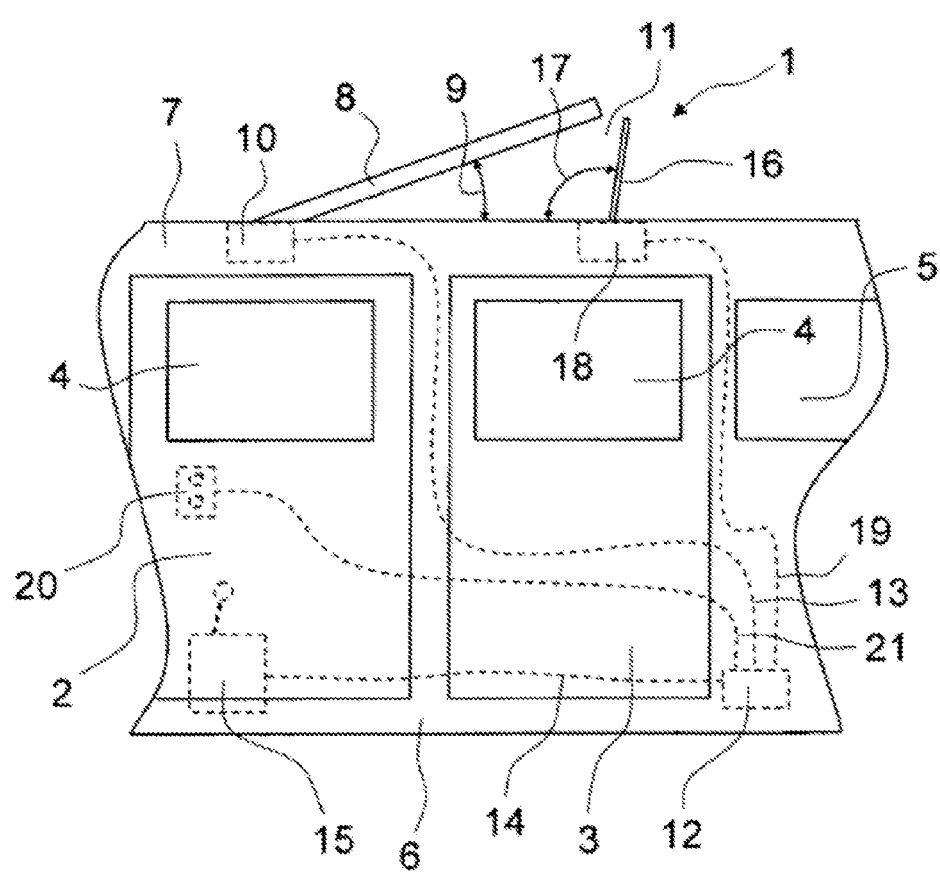

DEVICE FOR SEALING THE APERTURE OF A TIPPED-BACK SLIDING ROOF

BACKGROUND OF THE INVENTION

1. Field of the Invention

The invention concerns a device for sealing an aperture of a sliding roof of a personal vehicle.

2. Description of Related Art

Sliding roofs can be opened by means of parallel displacement in the plane of the roof or alternatively by tipping them back. The existing aperture serves for protected and, insofar as possible, tension-free ventilation of a personal vehicle (PV).

However, the drawback is that the undesired penetration of rain, leaves, and such dross can be made possible through the aperture of the open sliding roof.

Hence, generic devices are known which seal the opening of a tipped-back sliding roof. In order not to hinder the specific ventilation purpose of the open sliding roof, the sealing has to occur such that ventilation is still possible, therefore, for example, by means of lattices, slots, or the like.

Such a generic device is described in DE 101 25 638 C1. At the same time, the aperture is sealed by means of a grid, which is movable in operation parallel to the roof. Control of this device occurs based on an alarm system built into the PV, such that when the alarm system turns on, the grid slides into the sealing position.

In vehicles without an alarm system or if it has been disconnected, this known generic device is not effective.

In particular, therefore, it cannot prevent the tiresome problem that especially occurs in the fall with a lot of rain and heavy leaf-fall, if the PV is being driven in reverse. A sliding roof that is tipped back then operates like a catchment and collects all the dross from the long roof surface behind the sliding roof, to carry it inside.

A sliding roof is known from DE 26 36 749 A1 with a protective grid, which is displaced parallel to the roof and is automatically closed when the sliding roof is open. This construction is disadvantageous, however, because the aperture with the lattice is permanently sealed and it consequently also hinders ventilation.

BRIEF SUMMARY OF THE INVENTION

The task of the present invention consists of creating a generic device which solves the problem of fouling the inside when driving in reverse.

This problem is solved by means of a device comprising a control mechanism, which is constructed to monitor a gearbox of the personal vehicle and, upon recognizing shifting of the gearbox into reverse gear, to effect sealing of the aperture by closing the tipped-open sliding roof.

According to the invention, the sealing device of the aperture is controlled by a control mechanism, which monitors the gearbox of the PV, and when it establishes a shift to reverse, it triggers the sealing of the aperture. As a result, it is achieved that the aperture is then always sealed when it is driven in reverse, or immediately when reversing occurs, therefore at the desired moment, in order to prevent the problem of fouling when driving in reverse. When the drive is not in reverse, the aperture is not sealed, so that in all other operating positions, the aperture serves for unimpeded ventilation.

Advantageously, in one embodiment of the invention, sealing off the aperture is effected by closing the sliding roof. The control mechanism of the device can therefore, for example, directly control the electric motor controlling the sliding roof. The reverse-motion signal of the drive allows this to be achieved very easily, since all the PV's common today already transmit control signals anyway to other mechanisms upon shifting into reverse, for instance to the back-up lights or, for instance, to an electrically controlled rearview mirror on the passenger side. The construction according to the invention can therefore also be offered very simply, for instance, as a supplementary item.

Advantageously, in another embodiment of the invention, the sealing can, alternatively, be effected with a movable screen, which can be introduced into the aperture. This screen can, for example, be folded open in a pivoting motion and, like a movable wind deflector, for instance, disposed at the back end of the cutout for the sliding roof.

Advantageously, after finishing driving in reverse, the previously existing position of the sliding roof (manner of opening, sliding aperture or tipped aperture, and the respective degree of opening) is resumed, so that the driver, after the short time of driving in reverse, puts the previously set degree of ventilation back into operation automatically without having to pay attention to this procedure.

BRIEF DESCRIPTION OF THE DRAWINGS

In the drawing, the invention is represented by way of example and schematically in a single FIG. 1, which shows the invention in a side view of a PV equipped with the invention.

DETAILED DESCRIPTION OF THE INVENTION

FIG. 1 shows the side view of the central part of the chassis of a PV 1, with the front and rear cut off. The view is in the direction of forward travel on the left side of the PV, with a left front door 2 and a left rear door 3, each with a window 4, as well as a side rear window 5. Further-more, the left door sills 6 and the roof 7 may be seen.

A sliding roof 8 is positioned about a pivot axis around its lower edge lying in front in a cutout in the roof 7 (not depicted in FIG. 1), and can be tipped open and closed in the direction of the arrow 9. An electric motor 10, represented by dashed lines, serves to do this.

The sliding roof 8, tipped back, forms a funnel-shaped aperture constructed in the direction opposite to the direction of forward travel, and therefore toward the right in the drawing in FIG. 1, which collects inside it leaves, raindrops, and such dross lying on the roof 7 behind the sliding roof.

This problem is substantially exacerbated when driving in reverse, because then the air flow presses the dross directly into the aperture 11 formed below the rear edge of the sliding roof 8 and consequently presses it inside.

The invention relieves this with a protective mechanism. This exhibits a control mechanism 12, which controls by means of a cable 13 to the motor 10 and monitors the gearbox 15 of the PV 1 by means of a cable 14. As soon as a signal arrives by means of the cable 14 that the gearbox 15 has shifted into reverse, the control mechanism 12 sends a corresponding control command to the electric motor 10, whereby it closes the sliding roof 8.

If the sliding roof 8 is constructed, alternatively for tipping, to be able to also travel parallel to the roof, then the control device 12 first checks whether the roof is tipped before the closing process is triggered in response to a shift into reverse.

At the rear end of the cutout in the roof 7 containing the sliding roof 8 is disposed a screen 16, which is pivotable about the end attached to the roof 7 in the manner as illustrated by the arrow 17. The screen 16 is activated by an electric motor 18, which is connected to a cable 19 to the control mechanism 12.

This construction of the protective mechanism with screen 16 can be provided additionally or alternatively to the construction with the control of the motor 10 to close the sliding roof 8. If the alternative with the screen 16 is used, then this screen 16 is normally folded down and is folded up after shifting into reverse, into the position illustrated in FIG. 1, in which the aperture 11 is sealed below the rear edge of the sliding roof 8. The screen 16 can also exhibit additional side walls, not depicted in FIG. 1, which breach the triangular surfaces between the side edges of the sliding roof 8 and the roof 7. The screen 16 can also be constructed as a lattice, in particular.

As illustrated in FIG. 1, the control mechanism 12 can also be used for manual control of the sliding roof 8. What is more, it can be controlled with a control cable 21 from a control 20, which is disposed on the vehicle accessible to the driver and exhibits, for instance, the pushbuttons "OPEN" and "CLOSED". The control 20 can accordingly also be constructed to control the screen 16.

The control mechanism 12 can be constructed to determine the position of the sliding roof 8 after recognizing a shift into reverse and to store it in memory before the sealing of the aperture 11 is effected. What is more, the control mechanism 12, with mechanisms not depicted, has to determine the manner in which the sliding roof is opened, namely by sliding in the plane of the roof or by tipping, as depicted in FIG. 1. Furthermore, the respective degree of opening has to be determined. The control mechanism 12, moreover, has to monitor the gearbox 15 of the PV 1 when shifting out of reverse again, in order to then move the sliding roof to the stored position automatically or at a corresponding control command.

The invention claimed is:

1. A device for sealing an aperture of a sliding roof of a personal vehicle that is in a tipped open position, wherein the device comprises a control mechanism, which is configured to monitor a gearbox of the personal vehicle and, upon recognizing shifting of the gearbox into reverse gear, to effect sealing of the aperture by closing the sliding roof.

2. The device according to claim 1, wherein the control mechanism of the device is further configured, after recognizing the shifting into reverse gear, to:
   determine and store the tipped open position of the sliding roof before effecting sealing of the aperture; and
   monitor the gearbox of the personal vehicle and, upon recognizing shifting of the gearbox out of reverse gear, to effect movement of the sliding roof back into the stored, tipped open position.

3. A device for blocking a back end of a cutout for a sliding roof of a personal vehicle that is in a tipped open position, wherein the device comprises:
   a movable screen, which can be folded open from a closed position in a pivoting motion to block the back end of the cutout for the sliding roof; and
   a control mechanism, which is configured to monitor a gearbox of the personal vehicle and, upon recognizing shifting of the gearbox into reverse gear, to effect blocking of the back end of the cutout for the sliding roof by folding open the movable screen in the pivoting motion.

4. The device according to claim 3, wherein the control mechanism of the device is further configured to monitor the gearbox of the personal vehicle and, upon recognizing shifting of the gearbox out of reverse gear, to effect movement of the movable screen back into the closed position.

* * * * *